US010220822B2

(12) United States Patent
Linhoff et al.

(10) Patent No.: US 10,220,822 B2
(45) Date of Patent: Mar. 5, 2019

(54) BRAKE CONTROL DEVICE AND BRAKE SYSTEM FOR VEHICLES

(71) Applicant: Continental Teves AG & Co. oHG, Frankfurt (DE)

(72) Inventors: Paul Linhoff, Neu-Anspach (DE); Andreas Heise, Erzhausen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/110,260

(22) PCT Filed: Dec. 12, 2014

(86) PCT No.: PCT/EP2014/077584
§ 371 (c)(1),
(2) Date: Jul. 7, 2016

(87) PCT Pub. No.: WO2015/106892
PCT Pub. Date: Jul. 23, 2015

(65) Prior Publication Data
US 2016/0339885 A1 Nov. 24, 2016

(30) Foreign Application Priority Data

Jan. 15, 2014 (DE) .................. 10 2014 200 561
Oct. 9, 2014 (DE) .................. 10 2014 220 440

(51) Int. Cl.
*B60T 13/74* (2006.01)
*B60T 8/36* (2006.01)
(Continued)

(52) U.S. Cl.
CPC .............. *B60T 8/368* (2013.01); *B60T 8/171* (2013.01); *B60T 8/4072* (2013.01);
(Continued)

(58) Field of Classification Search
CPC . B60T 7/12; B60T 7/042; B60T 8/348; B60T 8/368; B60T 8/4081; B60T 13/686; B60T 17/02
(Continued)

(56) References Cited

U.S. PATENT DOCUMENTS 5,984,429 A * 11/1999 Nell .................. B60T 7/042
303/113.4
6,837,552 B2 * 1/2005 Reuter .................. B60T 7/042
303/122.09

(Continued)

FOREIGN PATENT DOCUMENTS

CN 101128348 A 2/2008
DE 102004023007 12/2005
(Continued)

OTHER PUBLICATIONS

International Search Report and Written Opinion of the International Searching Authority for International Application No. PCT/EP2014/077584 dated May 6, 2015.
(Continued)

Primary Examiner — Christopher P Schwartz
(74) Attorney, Agent, or Firm — RatnerPrestia

(57) ABSTRACT

A brake control device for at least four fluidically actuatable, especially hydraulically actuatable, wheel brakes of a vehicle brake system, which device includes at least one input pressure connection, a wheel-specific output pressure connection for every wheel brake, a pressure regulating valve array for setting wheel-specific brake pressures at the output pressure connections and a pressure source the brake control device having a wheel specific input pressure connection for every wheel brake.

20 Claims, 10 Drawing Sheets

(51) Int. Cl.
*B60T 13/68* (2006.01)
*B60T 17/02* (2006.01)
*B60T 17/18* (2006.01)
*B60T 8/40* (2006.01)
*B60T 8/171* (2006.01)

(52) U.S. Cl.
CPC ............ *B60T 13/686* (2013.01); *B60T 17/02* (2013.01); *B60T 17/18* (2013.01); *B60T 2270/82* (2013.01)

(58) Field of Classification Search
USPC ......... 303/3, 7, 15, 20, 122.09, 146, 122.03, 303/122.04
See application file for complete search history.

(56) References Cited

U.S. PATENT DOCUMENTS

| | | | |
|---|---|---|---|
| 7,469,974 | B2 | 12/2008 | Maki |
| 7,887,145 | B2* | 2/2011 | Niino .................... B60T 8/4081 303/11 |
| 8,840,196 | B2* | 9/2014 | Hitzel ...................... B60L 7/24 303/10 |
| 8,950,826 | B2 | 2/2015 | Kunz |
| 9,096,206 | B2 | 8/2015 | Linkenbach |
| 9,308,905 | B2 | 4/2016 | Biller |
| 9,463,780 | B2* | 10/2016 | Thrasher ............... B60T 8/4081 |
| 2004/0075337 | A1 | 4/2004 | Giers |
| 2006/0184306 | A1* | 8/2006 | Kolberg ................ B60T 8/1703 701/70 |
| 2008/0030069 | A1* | 2/2008 | Griffith .................. B60T 7/042 303/20 |
| 2009/0079259 | A1* | 3/2009 | Iwasaki .................... B60T 1/10 303/146 |
| 2014/0152085 | A1 | 6/2014 | Biller et al. |
| 2016/0325719 | A1* | 11/2016 | Linhoff .................... B60T 7/12 |

FOREIGN PATENT DOCUMENTS

| | | |
|---|---|---|
| DE | 102006035444 | 5/2007 |
| DE | 102010002280 | 8/2011 |
| DE | 102012205962 | 11/2012 |
| DE | 102011122776 | 1/2013 |
| DE | 102012210809 | 1/2013 |
| WO | 0242138 | 5/2002 |
| WO | 2012028521 | 3/2012 |
| WO | 2012150120 A1 | 11/2012 |

OTHER PUBLICATIONS

German Search Report for German Application No. 10 2014 220 440.2 dated May 20, 2015, including partial translation.
Chinese Office Action for Chinese Application No. 201480073404.1, dated Feb. 1, 2018, including English translation, 18 pages.

* cited by examiner

BRAKE CONTROL DEVICE AND BRAKE SYSTEM FOR VEHICLES

CROSS REFERENCE TO RELATED APPLICATIONS

This application is the U.S. National Phase application of PCT International Application No. PCT/EP2014/077584, filed Dec. 12, 2014, which claims priority to German Patent Application No. 10 2014 200 561.2, filed Jan. 15, 2014 and 10 2014 220 440.2, filed Oct. 9, 2014, the contents of such applications being incoporporated by reference herein.

FIELD OF THE INVENTION

The invention relates to a brake control device and to a brake system.

BACKGROUND OF THE INVENTION

Hydraulic brake systems are widespread in motor vehicles. So-called "brake-by-wire" brake systems are being used to an increasing extent, in the case of which brake applications triggered by electrical or electronic (externally actuated) control can be carried out. Such brake applications, which are triggered by electronic control units, are utilized, for example, in automatic distance control systems or (emergency) braking assistance functions. Brake systems are also known, which detect the brake actuation only electronically even in the case of a normal brake actuation by the driver and initiate a brake application without any direct mechanical or hydraulic action by the driver.

Known conventional hydraulic vehicle brake systems often comprise wheel brakes (e.g., hydraulically actuated disk brakes), an electrohydraulic brake slip-driving stability control unit (HECU), and a brake actuation device having a vacuum brake booster. The electronic regulator of the electrohydraulic control unit is usually designed according to the so-called "fail silent" principle, i.e., after a fault is detected, the control unit is completely or partially electrically switched into a non-functioning state. An option for the brake system to be actuated by the driver, e.g., without electrical support or the possibility of electrical influence, remains, however.

Known electrohydraulic control units for ABS/ESP motor vehicle brake systems comprise two inlet pressure connections, i.e., one inlet pressure connection for each of the two brake circuits, four wheel-specific outlet pressure connections, a pressure regulating valve arrangement for setting wheel-specific brake pressures at the outlet pressure connections, a low-pressure accumulator for each brake circuit for accommodating pressure medium drained out of the wheel brakes, and a dual-circuit return pump.

In addition, electrohydraulic simulator brake systems are known, in which the brake pedal feel in the normal operating mode is generated by a simulator. In the event of a fault, a direct actuation of the wheel brakes by the driver is still typically possible, however, in a so-called hydraulic fallback mode.

It is to be expected that vehicle brake systems which are suitable for automatically driving vehicles will also come into use in the future. These brake systems must be, in principle, externally actuatable systems or "brake-by-wire" systems. This means that a braking demand can be requested via electronic or electrical control signals and can be implemented by the system without any action by the driver. In this case, a sufficiently high level of availability of the brake system or of the externally actuatable brake function must be ensured, for safety reasons.

For example, brake systems are conceivable, in principle, in which two complete brake systems operate in parallel using different brakes, e.g., brake calipers, on one or more brake disks of a motor vehicle. This parallel design is highly complex, however, and is therefore cost-intensive, and requires a multiplicity of special new designs of the individual brake system components, which makes such a system susceptible to error as compared to available mass-produced products.

A shutoff of the brake system after an initial fault of any kind is not possible for highly automatic or highly automated driving (HAD). In the event of failure of an electronic control unit assigned to the autonomous driving, it should be possible to continue providing a functional, autonomous braking function and a steering function, at least for a predefined time period (e.g., a few seconds), since it must not be assumed that the driver can resume guiding the vehicle immediately after a failure of the control unit, but rather that the driver must first be prompted to take up the task of driving again and must become oriented thereto.

A brake system for motor vehicles is known from WO 2012/028521 A1, which is incorporated by reference, which system is provided with an electrically controllable pressure generating device, a pressure regulating valve arrangement for regulating and/or controlling the wheel brake pressures induced at the individual wheel brakes, and a first electronic control and regulating unit, which controls or regulates the pressure generating device and the pressure regulating valve arrangement, wherein an electrically controllable auxiliary pressure generating device is provided with a second electronic control and regulating unit, by means of which the master brake cylinder can be actuated. In the event of a failure of the first electronic control and regulating unit, however, it is no longer possible to set wheel-specific brake pressures at the wheel brakes by means of the pressure regulating valve arrangement. The brake system is therefore less suitable for highly automated or autonomously driving motor vehicles.

SUMMARY OF THE INVENTION

The problem addressed by an aspect of the present invention is that of providing a brake control device and a brake system for vehicles, with which the safety requirements of highly automated driving or autonomous driving are met.

An aspect of the invention is based on the concept that the brake control device, which comprises a pressure source, a wheel-specific outlet pressure connection for each wheel brake, and a pressure regulating valve arrangement for setting wheel-specific wheel pressures at the outlet pressure connections, has a wheel-specific inlet pressure connection for each wheel brake. This brake control device can be connected in series between a brake control device, which is known per se and has a wheel-specific outlet pressure connection for each wheel brake and a pressure regulating valve arrangement for setting wheel-specific brake pressures at the outlet pressure connections, and the wheel brakes. Therefore, even in the event of failure of one of the brake control devices, a wheel-specific regulation at each wheel brake is still possible by means of the other brake control device.

An aspect of the invention provides the advantage that, in the event of any type of simple fault of the brake system, it is still possible to safely brake the vehicle in any type of driving situation, i.e., in particular using wheel-specific wheel brake pressures, without the need for support by the driver.

An aspect of the invention provides the advantage that a brake control device or a brake system is provided with a brake control device which ensures a redundant, wheel-specific brake control function, in particular an ESP function (driving stability function, ESP: electronic stability program). The full brake control function is still available even after the occurrence of any type of simple fault.

Preferably this is an electrohydraulic brake control device for at least four hydraulically actuatable wheel brakes. This is also preferably a brake system for motor vehicles comprising hydraulically actuatable wheel brakes. The invention also relates, however, to an electropneumatic brake control device and a pneumatic brake system.

A pressure regulating valve arrangement preferably comprises at least one electrically actuatable valve for each wheel brake, in order to enable wheel-specific brake pressures to be set at the wheel-specific outlet pressure connections.

The brake control device according to an aspect of the invention also provides the advantage that it can be optionally retrofitted in a vehicle or in a brake system known per se, in order to permit highly automated driving or autonomous driving.

According to a preferred embodiment of the brake control device according to an aspect of the invention, the pressure source of the brake control device comprises at least one pump or at least one pump circuit of a pump for each wheel brake, so that each wheel brake can be supplied by a single pump path.

For the purpose of regulating the wheel brake pressures, the brake control device preferably comprises a pressure sensor for each wheel brake for detecting the wheel brake pressure.

The pressure regulating valve arrangement of the brake control device preferably comprises at least one valve for each wheel brake, which valve is electrically actuatable, can be controlled in an analog manner, or is designed so as to be analogized.

In order to be capable of quickly and sufficiently pumping pressure medium into the wheel brakes, the brake control device according to a refinement of the brake control device according to the invention comprises at least one pressure medium reservoir, which stores pressure medium for filling at least one wheel brake. Particularly preferably, one pressure medium reservoir for each wheel brake is provided in the brake control device.

The brake control device is preferably designed as a single part, as a brake control unit. Particularly preferably, the brake control unit comprises an electronic control and regulating unit and a hydraulic control and regulating unit. The pressure source is advantageously designed as an at least four-circuit pump.

In order to account for the larger volumetric uptake of pressure medium by the front wheel brakes, one dual-circuit pump or two pumps is assigned to each front wheel brake.

Alternatively, it is preferable that the brake control device is in two parts or in multiple parts, in order to enable the individual control units to be positioned in the vehicle in a more flexible manner. Particularly preferably, the brake control device is designed as two brake control units. Particularly preferably, each brake control unit comprises an electronic control and regulating unit and a hydraulic control and regulating unit, wherein the hydraulic control and regulating unit advantageously comprises the pressure control valves for the wheel brakes assigned to the brake control unit.

Each brake control unit preferably comprises an at least dual-circuit pump as a pressure source.

An aspect of the invention also relates to a brake system for vehicles comprising a brake control device according to the invention.

The brake control device is preferably added, as an auxiliary device, to an externally actuatable brake system known per se (particularly preferably to a "by-wire" brake system or a conventional brake system having a vacuum brake booster) as an at least partially redundant system, wherein the (second) brake control device according to the invention is connected in series between the (first) brake control device of the brake system known per se, and the wheel brakes. In the event of failure of the first brake control device, the (second) brake control device according to the invention preferably takes over the brake functions, in particular the pressure build-up function in the wheel brake circuits, but also, advantageously, (wheel-specific) brake control interventions. Particularly preferably, the brake control device according to the invention carries out not only simple brake functions, but also electronic brakeforce distribution (EBD) and/or an anti-lock control function (ABS) and/or driving dynamics functions (ESP) and/or other types of brake activations.

Preferably, the second brake control device comprises a wheel-specific inlet pressure connection for each wheel brake, wherein each wheel-specific inlet pressure connection of the first brake control device is connected to exactly one of the inlet pressure connections of the second brake control device.

Correspondingly, the second brake control device preferably comprises, for each wheel brake, a wheel-specific outlet pressure connection, which is connected to one of the wheel brakes.

The interposed, second brake control device preferably automatically sets or regulates (wheel) brake pressures, if need be, in particular when hydraulic wheel brake pressures are not introduced by the upstream, first brake control device.

The second brake control device is preferably designed such that it merely builds up or reduces a brake pressure if a specified pressure is not present.

Alternatively, the second brake control device is preferably designed such that it can actively reduce pressure in spite of a specified pressure of the upstream, first brake control device.

The brake system is preferably designed such that the second brake control device becomes active, except for self-tests, only in the event of failure of the first brake control device. Alternatively, the brake system is preferably designed such that the second brake control device is also utilized in typical braking operations during normal operation, e.g., in order to increase the performance of the brake system.

The interconnection of the brake system is preferably designed such that the first (e.g., conventional) brake control device can carry out various or all brake control functions independently of the second brake control device, and the second second brake control device can also carry out various or even all brake control functions, and particularly preferably can also carry opt the brake application for individual or multiple wheels for the purpose of influencing vehicle stability or steering.

Preferably, the brake control devices are designed such that, during normal operation (no failure of a brake control device), a brake control device (advantageously the second brake control device) is in a passive mode (e.g., only self-monitoring and testing) and the other brake control device (advantageously the first brake control device) carries out the usual regulating functions.

Alternatively, it is preferred that, during normal operation, the first and second brake control devices are involved in the regulation, at least intermittently, in order to provide greater regulating performance, e.g., in individual cases.

The first brake control device is preferably designed as a single part, as a brake control unit having an electronic control and regulating unit and a hydraulic control and regulating unit, or is designed in multiple parts, particularly preferably in two parts, as two brake control units, each of which has an electronic control and regulating unit and a hydraulic control and regulating unit.

The brake system preferably comprises an integrated or separate (first) electrohydraulic brake control device of a conventional brake system having at least one electrohydraulic control unit having integrated electronics.

Particularly preferably, the second brake control device is divided into two control units.

According to one preferred embodiment of the brake system according to an aspect of the invention, at least two devices for detecting a wheel speed are provided for each of the wheels provided with a wheel brake, wherein, in each case, the signal from one of the devices is fed to the first brake control device and the signal from the other device is fed to the second brake control device.

Preferably, in a second brake control device designed as two brake control units, the signals from the other devices are fed to the same brake control unit.

Alternatively, in a second brake control device designed as two brake control units, the signal from the other device is fed to the brake control unit to which the associated wheel brake for setting the brake pressure is assigned.

According to another preferred embodiment of the brake system according to an aspect of the invention, at least one redundantly designed device for detecting a wheel speed is provided for each of the wheels provided with a wheel brake, wherein, in each case, the signal from the device is fed to the first brake control device and the other signal is fed to the second brake control device.

In order to increase the availability of the brake system, the first brake control device is preferably supplied with electrical energy from a first electrical energy source and the second brake control device is preferably supplied with electrical energy from a second electrical energy source. The first and the second energy sources, and the associated supply lines, are particularly preferably independent of one another.

Preferably, the second brake control device is supplied with electrical energy from at least one independent electrical energy source.

Preferably, the first and the second brake control devices are supplied with electrical energy from more than one electrical energy source.

Preferably, different information channels (e.g., data buses) to the brake control devices are provided.

Preferably, the brake system comprises a third electronic control and regulating unit, which specifies a braking demand or a brake pressure setpoint value. Particularly preferably, the first brake control device is connected via a first data connection and the second brake control device is connected via a second data connection to the third electronic control and regulating unit. The data connections are advantageously designed as data buses.

BRIEF DESCRIPTION OF THE DRAWINGS

Further preferred embodiments of the invention shall become apparent from the dependent claims and from the following description with reference to figures.

Schematically in the drawings.

DETAILED DESCRIPTION OF THE PREFERRED EMBODIMENTS

Figure 1:
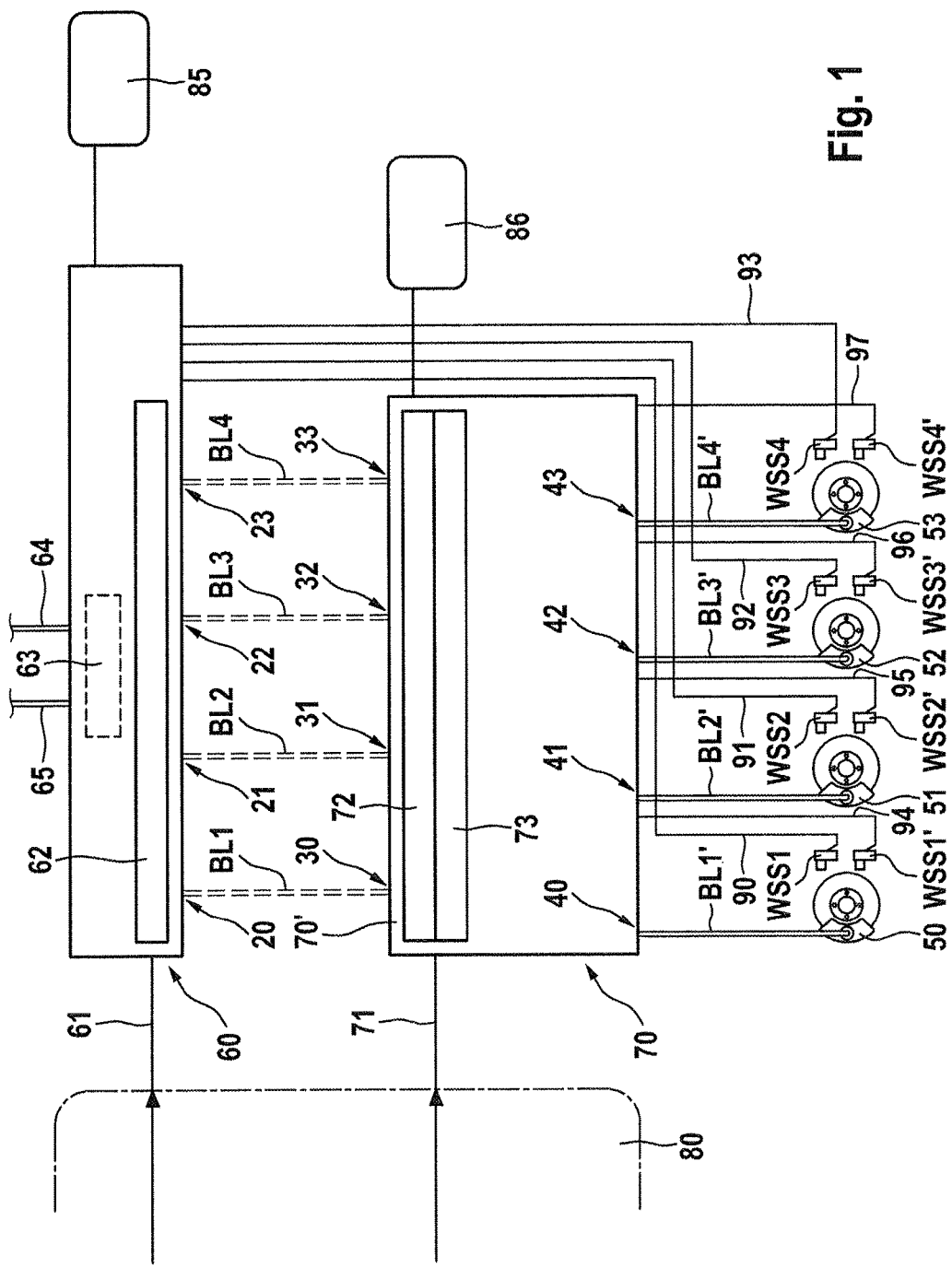
FIG. 1 shows a first exemplary embodiment of a brake system according to an aspect of the invention.

FIG. 1 shows a section of a first exemplary embodiment of a brake system according to an aspect of the invention. The brake system presented by way of example essentially comprises four hydraulically actuatable wheel brakes 50, 51, 52, 53, a first electrohydraulic brake control device 60, which comprises a schematically indicated, first pressure regulating valve arrangement 62 for setting wheel-specific brake pressures, and a wheel-specific outlet pressure connection 20, 21, 22, 23 for each wheel brake 50, 51, 52, 53, and a second electrohydraulic brake control device 70, which comprises a schematically indicated, second pressure regulating valve arrangement 72 and a second electrically controllable pressure source 73. The brake control device 70 is connected hydraulically in series between the first brake control device 60 and the wheel brakes 50, 51, 52, 53. For this purpose, the brake control device 70 comprises a wheel-specific inlet pressure connection 30, 31, 32, 33 and a wheel-specific outlet pressure connection 40, 41, 42, 43 for each wheel brake 50, 51, 52, 53.

Advantageously, the first brake control device 60 comprises a schematically indicated, electrically controllable pressure source 63, by means of which a brake pressure can be generated, in particular independently of a brake pedal actuation by the driver.

The brake system preferably comprises further components, which are known per se, such as, e.g., a brake pedal or a brake pedal-actuatable master brake cylinder, which are not illustrated in FIG. 1, for the sake of clarity. By way of example, the brake control device 60 is connected to the pressure chambers of a master brake cylinder, which is indicated in FIG. 1 by two brake circuit lines 64, 65.

The brake system therefore also comprises, in addition to the first brake control device 60, an additional second brake control device 70, wherein each wheel-specific outlet pressure connection 20, 21, 22, 23 of the brake control device 60 is connected to exactly one of the wheel-specific inlet pressure connections 30, 31, 32, 33 of the brake control device 70 via a high pressure-resistant brake line BL1, BL2, BL3, BL4. One high pressure-resistant brake line BL1', BL2', BL3', BL4' connects exactly one outlet pressure connection 40, 41, 42, 43, respectively, of the brake control device 70 to exactly one of the wheel brakes 50, 51, 52, 53, respectively. Therefore, a wheel-specific brake application can be carried out by means of the pressure regulating valve arrangement 62 of the brake control device 60 or by means of the pressure regulating valve arrangement 72 of the brake control device 70.

In order to further increase the availability of the brake control function, each brake control device 60, 70 is supplied with electrical energy from a separate (independent) electrical energy supply 85, 86, wherein the electrical energy supply 85 is assigned to the brake control device 60 and the electrical energy supply 86 is assigned to the brake control device 70.

By way of example, the first brake control device 60 is designed as a single part, as a brake control unit (HECU) having an electronic control and regulating unit (ECU) and a hydraulic control and regulating unit (HCU).

By way of example, the second brake control device 70 is also designed as a single part, as a brake control unit 70' (HECU) having an electronic control and regulating unit (ECU) and a hydraulic control and regulating unit (HCU).

The brake system presented by way of example also comprises a third electronic control and regulating unit 80 or is connected to a third electronic control and regulating unit 80. This is used, e.g., for controlling further vehicle functions, in particular the functions for highly automated or autonomous driving (HAD). The control and regulating unit 80 specifies, for example, a braking demand or a brake pressure setpoint value to the brake system, which value is forwarded to the brake control devices 60, 70. For this purpose, the first brake control device 60 is connected via a first data connection 61, e.g., a first data bus, and the second brake control device 70 is connected via a second data connection 71, e.g., a second data bus, to the electronic control and regulating unit 80. The control unit 80 is, e.g., a vehicle controller or an HAD controller.

In a vehicle having an HAD function, a braking demand or even a deceleration demand or the like, which is transmitted by the HAD control unit 80 as a command/specification to the first brake control device 60, is advantageously also transmitted simultaneously to the second brake control device 70. If both brake control devices 60, 70 are intact, only one brake control devices, e.g., the first brake control device 60, implements the request. The second brake control device 70 takes over the wheel-specific brake pressure regulation, in particular, only in the event of failure of the first brake control device 60 or when said device requests support.

Systems are conceivable in which the two brake control devices 60, 70 trigger or request motor functions, e.g., even steering demands, between one another. Systems are also conceivable in which these demands are specified by one or multiple other control units.

Assigned to the wheel of each wheel brake 50, 51, 52, 53 are, by way of example, two wheel speed sensors, i.e., wheel speed sensors WSS1 and WSS1' for the wheel of the wheel brake 50, wheel speed sensors WSS2 and WSS2' for the wheel of the wheel brake 51, wheel speed sensors WSS3 and WSS3' for the wheel of the wheel brake 52, and wheel speed sensors WSS4 and WSS4' for the wheel of the wheel brake 53. The signal from one wheel speed sensor WSS1, WSS2, WSS3, WSS4 is fed to the first brake control device 60 via a signal line 90, 91, 92, 93, respectively, and the signal from the other wheel speed sensor WSS1', WSS2', WSS3', WSS4' is fed via a signal line 94, 95, 96, 97, respectively, to the second brake control device 70.

Instead of at least two devices for each wheel brake for detecting the wheel speed, it is also possible to provide a redundantly designed device for detecting the wheel speed a (redundant wheel speed sensor), which delivers two wheel speed signals, which are independent of one another.

Figure 2:
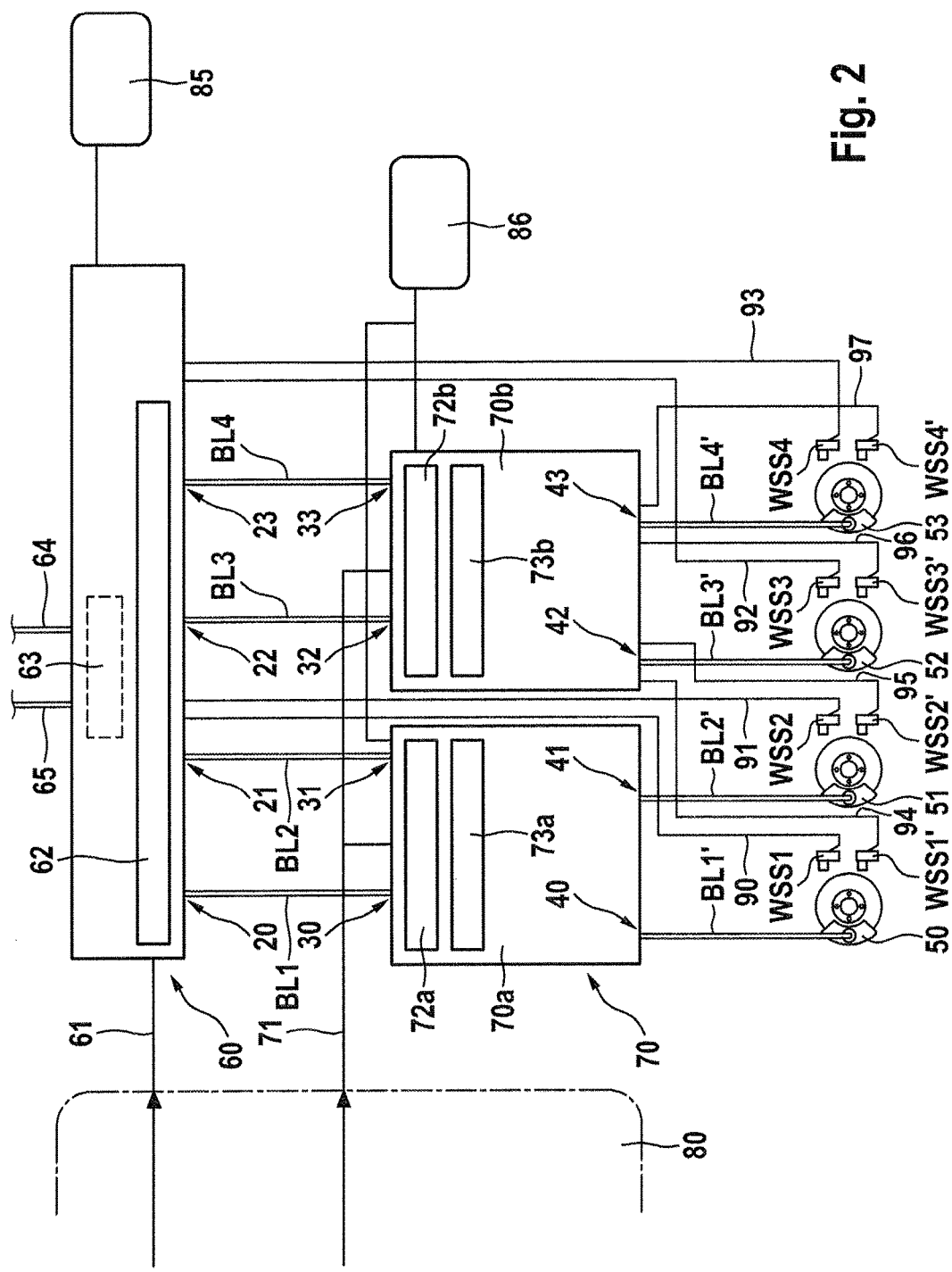
FIG. 2 shows a second exemplary embodiment of a brake system according to an aspect of the invention.

FIG. 2 shows a section of a second exemplary embodiment of a brake system according to an aspect of the invention. The brake system according to FIG. 2, which is presented by way of example, largely corresponds to the first exemplary embodiment and essentially comprises four hydraulically actuatable wheel brakes 50, 51, 52, 53, a first electrohydraulic brake control device 60, which comprises a first pressure regulating valve arrangement 62 for setting wheel-specific brake pressures, and a wheel-specific outlet pressure connection 20, 21, 22, 23 for each wheel brake 50, 51, 52, 53, and a second electrohydraulic brake control device 70, which is connected hydraulically in series between the first brake control device 60 and the wheel brakes 50, 51, 52, 53. For this purpose, the brake control device 70 comprises, for each wheel brake 5Q, 51, 52, 53, a wheel-specific inlet pressure connection 30, 31, 32, 33, which is connected to exactly one wheel-specific outlet pressure connection 20, 21, 22, 23 of the brake control device 60 via a high pressure-resistant brake line BL1, BL2, BL3, BL4, and a wheel-specific outlet pressure connection 40, 41, 42, 43, which is connected via a high pressure-resistant brake line BL1', BL2', BL3', BL4' to the wheel brake 50, 51, 52, 53.

In contrast to the exemplary embodiment from FIG. 1, the second brake control device 70 of the exemplary embodiment from FIG. 2 is designed in two parts, as two brake control units 70a, 70b (first second brake control unit 70a and second second brake control unit 70b). This has design-related advantages, e.g., the two brake control units 70a, 70b can be disposed, e.g., independently of one another.

Each brake control unit 70a, 70b comprises an electronic control and regulating unit (ECU) and a hydraulic control and regulating unit (HCU).

The brake control unit 70a is assigned to the wheel brakes 50 and 51, while the brake control unit 70b is assigned to the wheel brakes 52 and 53. Each brake control unit 70a, 70b comprises a pressure regulating valve arrangement 72a, 72b and an electrically controllable pressure source 73a, 73b for the assigned wheel brakes 50, 51 and 52, 53, respectively.

The brake system presented by way of example also comprises a third electronic control and regulating unit 80 or is connected to a third electronic control and regulating unit 80, which is used, e.g., for controlling the functions for highly automated or autonomous driving (HAD). The control and regulating unit 80 is connected via a first data connection 61, e.g., a first data bus, to the first brake control device 60, and via a second data connection 71, e.g., a second data bus, to the brake control units 70a, 70b.

Assigned to the wheel of each wheel brake 50, 51, 52, 53 are, by way of example, two wheel speed sensors, i.e., wheel speed sensors WSS1 and WSS1' for the wheel of the wheel brake 50, wheel speed sensors WSS2 and WSS2' for the wheel of the wheel brake 51, wheel speed sensors WSS3 and WSS3' for the wheel of the wheel brake 52, and wheel speed sensors WSS4 and WSS4' for the wheel of the wheel brake 53. The signal from one wheel speed sensor WSS1, WSS2, WSS3, WSS4 is fed to the first brake control device 60 via a signal line 90, 91, 92, 93, respectively.

The signals from the other wheel speed sensors WSS1', WSS2', WSS3', WSS4' are fed via a signal line 94, 95, 96, 97, respectively, to the same brake control unit 70b.

The signals from the (additional) wheel speed sensors WSS1'-WSS4' can also be divided among the different brake control units 70a, 70b, however.

By way of example, two independent electrical energy supplies 85, 86 are provided, wherein the electrical energy supply 85 is assigned to the brake control device 60, and the electrical energy supply 86 is assigned to the brake control device 70 and to the brake control units 70a, 70b.

FIG. 3 shows schematic illustrations of three hydraulic brake systems, which are known per se and are presented by way of example, in which a (second) brake control device according to an aspect of the invention can be disposed hydraulically in series between the first brake control device 60 and the wheel brakes 50, 51, 52, 53.

Figure 3A:
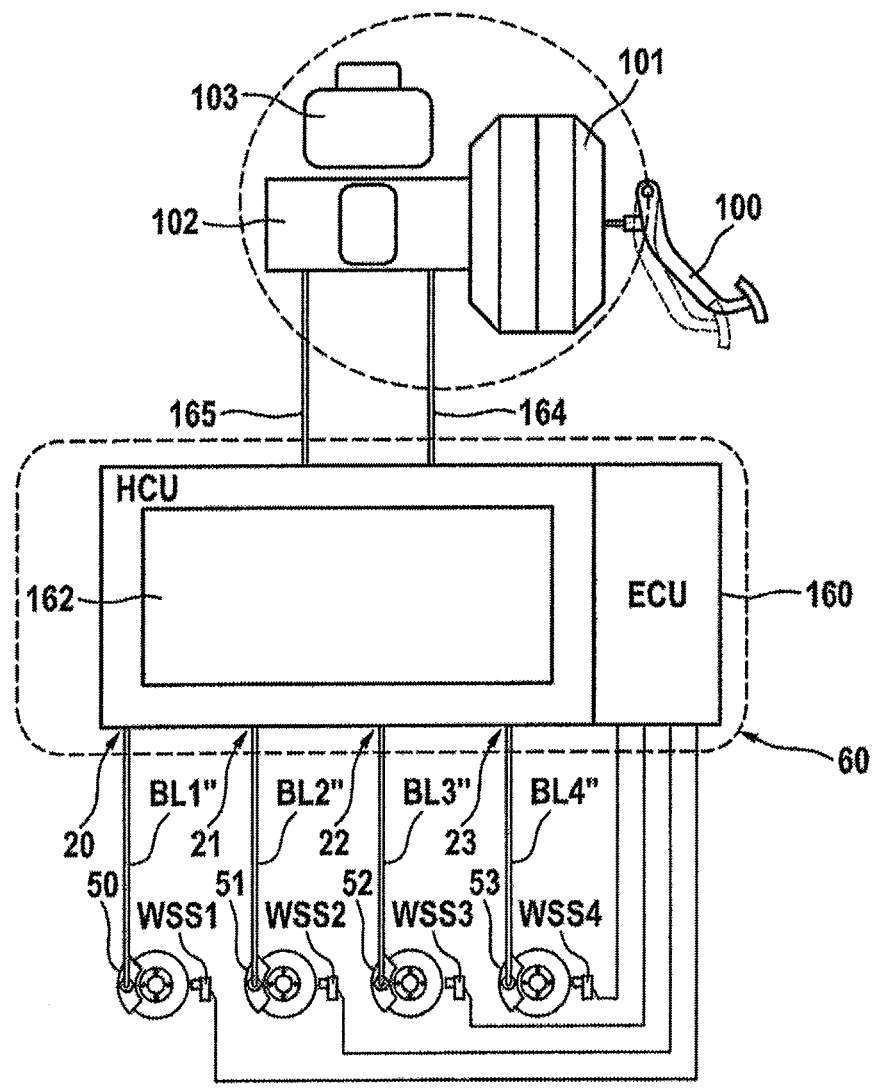
FIGS. 3a-3c show brake systems, which are known per se and are presented by way of example, in which a brake control device according to an aspect of the invention can be disposed.

FIG. 3a schematically shows a conventional brake system comprising a brake pedal 100, a vacuum brake booster 101, a tandem master brake cylinder 102 having an assigned pressure medium reservoir 103, an electrohydraulic brake control device 60 and hydraulic wheel brakes 50, 51, 52, 53. The two pressure chambers of the tandem master brake cylinder 102 are connected via brake circuit lines 164, 165 to the two inlet pressure connections of the brake control device 60. The brake control device 60 comprises wheel-specific outlet pressure connections 20, 21, 22, 23, which are connected via brake lines BL1", BL2", BL3", BL4" to one of the wheel brakes 50, 51, 52, 53, respectively.

The brake control device 60 is designed as a single part, as a brake control unit (HECU) 160 having an electronic control and regulating unit (ECU) and a hydraulic control and regulating unit (HCU). The hydraulic unit comprises, by way of example, four wheel brake circuits, which are disposed in two brake circuits, and a pressure regulating valve arrangement for setting wheel-specific wheel brake pressures. Advantageously, a pressure source, e.g., a dual-circuit pump, is provided in the hydraulic unit, e.g., in order to enable pressure medium to be recirculated or to enable brake pressure to be actively built up. Preferably, the brake control unit 160 is designed as an ESP brake regulating unit, which is known per se and comprises a pressure regulating valve arrangement 162 having twelve valves for regulating the wheel brake pressures, a low-pressure accumulator for each brake circuit, and a dual-circuit return pump.

Assigned to each wheel is a wheel speed sensor WSS1, WSS2, WSS3, WSS4, the signals from which are fed to the electronic control and regulating unit of the brake control device 60.

According to one exemplary embodiment of a brake system according to an aspect of the invention, a brake control device according to an aspect the invention is connected in series, into the brake system from FIG. 3a, between the first brake control device 60 and the wheel brakes 50, 51, 52, 53, as the second electrohydraulic brake control device 70.

Figure 3B:
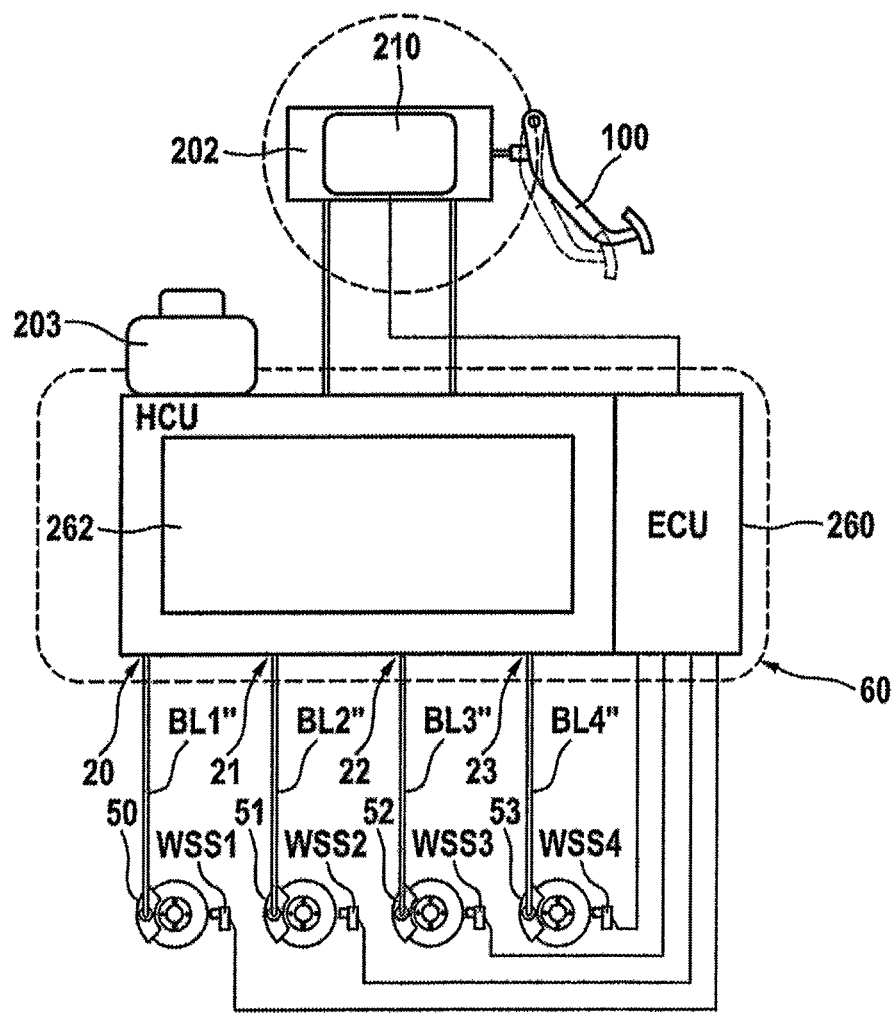

FIG. 3b schematically shows a brake system without a vacuum brake booster. A brake actuating element 202 is actuated by means of a brake pedal 100, and the brake pedal actuation is detected by means of a sensor 210. The brake actuating element 202 can be designed, e.g., as a hydraulic brake pedal feel simulator or as a master brake cylinder (for a hydraulic fallback mode). The brake system also comprises an electrohydraulic brake control device 60 having an assigned pressure medium reservoir 203 and hydraulic wheel brakes 50, 51, 52, 53, wherein the brake control device 60 comprises a pressure regulating valve arrangement 262 having at least one electrically actuatable valve for each wheel brake (for regulating the wheel brake pressures) and wheel-specific outlet pressure connections 20, 21, 22, 23, to each of which one of the wheel brakes 50, 51, 52, 53 is connected via a brake line BL1", BL2", BL3", BL4". The brake actuating element 202 and the brake control device 60 are connected to one another, for example, via two hydraulic lines, which are not described in greater detail.

The brake control device 60 is designed as a single part, as a brake control unit (HECU) 260 having an electronic control and regulating unit (ECU) and a hydraulic control and regulating unit (HCU). The brake control unit is preferably designed as an ESP brake regulating unit, which is known per se.

The signal from the sensor 210 is fed to the electronic control and regulating unit of the brake control unit 260.

Assigned to each wheel is a wheel speed sensor WSS1, WSS2, WSS3, WSS4, the signals from which are fed to the electronic control and regulating unit of the brake control device 60.

The brake pedal feel simulator can also be disposed in the brake control unit 260.

Such a brake system can also be designed without a hydraulic brake pedal feel simulator. In this case, a brake pedal actuation can be detected, e.g., purely electrically, and can be forwarded to the electronic control and regulating unit of the brake control device 60 for the implementation of the braking demand.

According to one exemplary embodiment of a brake system according to an aspect of the invention, a brake control device according to the invention is connected in series, into the brake system from FIG. 3b, between the first brake control device 60 and the wheel brakes 50, 51, 52, 53, as the second electrohydraulic brake control device 70.

Figure 3C:
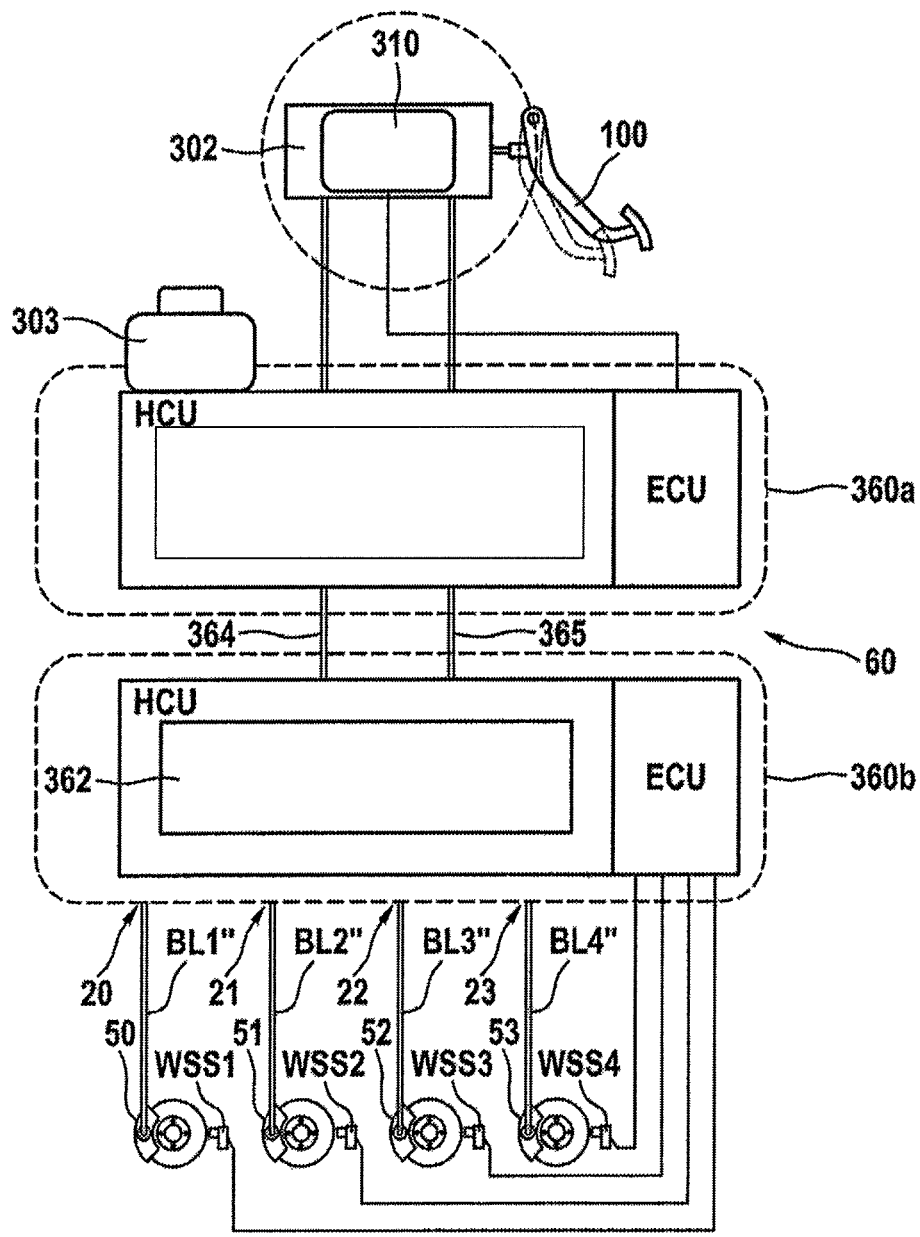

FIG. 3c schematically shows a further brake system without a vacuum brake booster. A brake actuating element 302 is actuated by means of a brake pedal 100, and the brake pedal actuation is detected by means of a sensor 310. The brake actuating element 302 can be designed, e.g., as a hydraulic brake pedal feel simulator or as a master brake cylinder (for a hydraulic fallback mode). The brake system also comprises an electrohydraulic brake control device 60 having an assigned pressure medium reservoir 303 and hydraulic wheel brakes 50, 51, 52, 53.

The brake control device 60 is designed in two parts, as two brake control units 360a, 360b, each having an electronic control and regulating unit (ECU) and a hydraulic control and regulating unit (HCU). The brake actuating element 302 and the brake control unit 360a are connected to one another, for example, via two hydraulic lines, which are not described in greater detail.

The brake control units 360a is used essentially for generating brake pressure and comprises an electrically controllable pressure source and two (brake circuit) outlet pressure connections, each of which is connected via a brake line 364, 365 to one of the two inlet pressure connections of the brake control unit 360b. The brake control units 360a preferably do not comprise pressure regulating valves.

The brake control units 360b is used essentially for generating brake pressure and comprises at least one pressure regulating valve arrangement 362 having at least one electrically actuatable valve for each wheel brake (for regulating the wheel brake pressures) and wheel-specific outlet pressure connections 20, 21, 22, 23, at which one of the wheel brakes 50, 51, 52, 53 is connected, respectively, via a brake line BL1", BL2", BL3", BL4".

The brake control units 360b optionally comprises an electrically controllable pressure source. The brake control unit 360b is preferably designed as an ESP brake regulating unit, which is known per se.

The signal from the sensor 310 is fed to the electronic control and regulating unit of the brake control unit 360a in order to be evaluated for the purpose of generating brake pressure.

Assigned to each wheel is a wheel speed sensor WSS1, WSS2, WSS3, WSS4, the signals from which are fed to the electronic control and regulating unit of the brake control unit 360b in order to be available for wheel brake pressure regulation.

The brake pedal feel simulator can also be disposed in the brake control unit 360a.

Such a brake system can also be designed without a hydraulic brake pedal feel simulator. In this case, a brake pedal actuation can be detected, e.g., purely electrically, and can be forwarded to the electronic control and regulating unit of the brake control device 60 for the implementation of the braking demand.

According to one exemplary embodiment of a brake system according to an aspect of the invention, a brake control device according to the invention is connected in series, into the brake system from FIG. 3c, between the brake control unit 360b and the wheel brakes 5Q, 51, 52, 53, as a further electrohydraulic brake control device 70.

Different exemplary embodiments of a brake control device 70 according to aspects of the invention are schematically illustrated in FIGS. 4 to 8. In this case, the brake control device 70 is designed as a single part, i.e., as a brake control unit 70', in the exemplary embodiments from FIGS. 4 to 6 and 8. The brake control unit 70' comprises an electronic control and regulating unit (ECU) and a hydraulic control and regulating unit (HCU). The different exemplary embodiments essentially differ in terms of the design of the hydraulic components. In the exemplary embodiment from FIG. 7, the brake control device 70 is designed in two parts, i.e., as two brake control units 70a, 70b. In this case, each brake control unit 70a, 70b comprises an electronic control and regulating unit (ECU) and a hydraulic control and regulating unit (HCU).

In principle, each of the hydraulic exemplary embodiments of the brake control device 70 described can be designed as a single part or in two parts. A division into three or more brake control units is also conceivable.

By way of example, the brake control device 70 is illustrated for four wheel brakes 50, 51, 52, 53; an expansion to more wheel brakes is easily possible. By way of example, the wheel brake 50 is assigned to the front right wheel (FR), the wheel brake 51 is assigned to the front left wheel (FL), the wheel brake 52 is assigned to the rear right wheel (RR), and the wheel brake 53 is assigned to the rear left wheel (RL).

Figure 4:
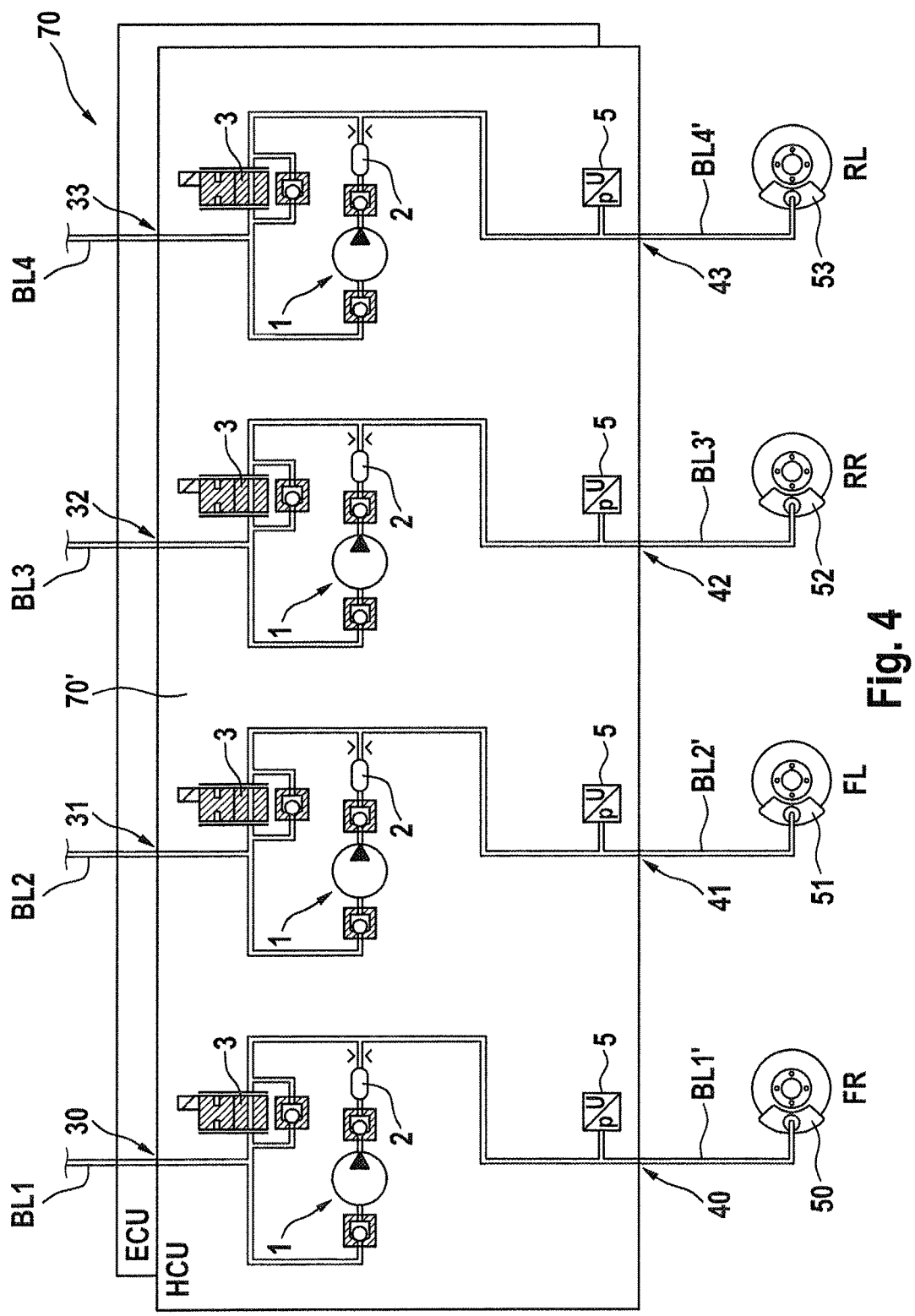
FIG. 4 shows a first exemplary embodiment of a brake control device according to an aspect of the invention.

A first exemplary embodiment of a brake control device 70 according to an aspect of the invention, which is designed as a single part, as a brake control unit 70', is schematically illustrated in FIG. 4. Connected to each of the four, wheel-specific inlet pressure connections 30, 31, 32, 33 of the brake control device 70 is a brake line BL1, BL2, BL3, BL4, each of which comes from one of the wheel-specific outlet pressure connections 20, 21, 22, 23 of the non-illustrated first brake control device 60. A brake line BL1', BL2', BL3', BL4', which leads to one of the wheel brakes 50, 51, 52, 53, is connected to the four, wheel-specific outlet pressure connections 40, 41, 42, 43, respectively, of the brake control device 70.

The brake control device 70 comprises, by way of example, four identical, completely separated pressure regulating circuits (one pressure regulating circuit for each wheel brake), each of which has an electrically controllable pressure source 1 and an electrically actuatable isolating valve 3. The four isolating valves 3 form a pressure regulating valve arrangement for setting wheel-specific brake pressures at the outlet pressure connections 40, 41, 42, 43.

In each pressure regulating circuit, the isolating valve 3 is disposed between the inlet pressure connection 30, 31, 32, 33 and the outlet pressure connection 40, 41, 42, 43. Preferably, the isolating valves 3 are designed so as to be open when not supplied with current, and so, in the event of a failure of the brake control device 70, the wheel-specific wheel brake pressures provided by the brake control device 60 are passed through by the brake control device 70 and are present at the outlet pressure connections 40, 41, 42, 43. Particularly preferably, the isolating valves 3 are designed so as to be analogized or controllable in an analog manner in order to provide for a wheel brake pressure regulation which is as precise as possible by means of the pressure regulating valve arrangement of the brake control device 70 in the event of a brake pressure regulation.

By way of example, a non-return valve, which is open in the direction of the wheel brake 50, 51, 52, 53, is connected in parallel to each isolating valve 3.

Each pressure source 1 is designed as a high-pressure pump comprising an electric motor and, by way of example, comprising a damping chamber 2 and two non-return valves. The intake side of the pump is connected to the assigned inlet pressure connection 30, 31, 32, 33 and the delivery side is connected to the assigned outlet pressure connection 40, 41, 42, 43.

Optionally, a pressure sensor 5 is provided for each wheel brake circuit for determining the pressure at an outlet pressure connection 40, 41, 42, 43.

The pressure source 1 of the brake control device 70 can also be designed as a four-circuit pump, which is driven by a common electric motor, wherein a pump circuit is assigned to each wheel brake 50, 51, 52, 53.

The pressure regulating valve arrangement of the first exemplary embodiment of the brake control device 70 comprises only one isolating valve 3 per wheel brake.

Figure 5:
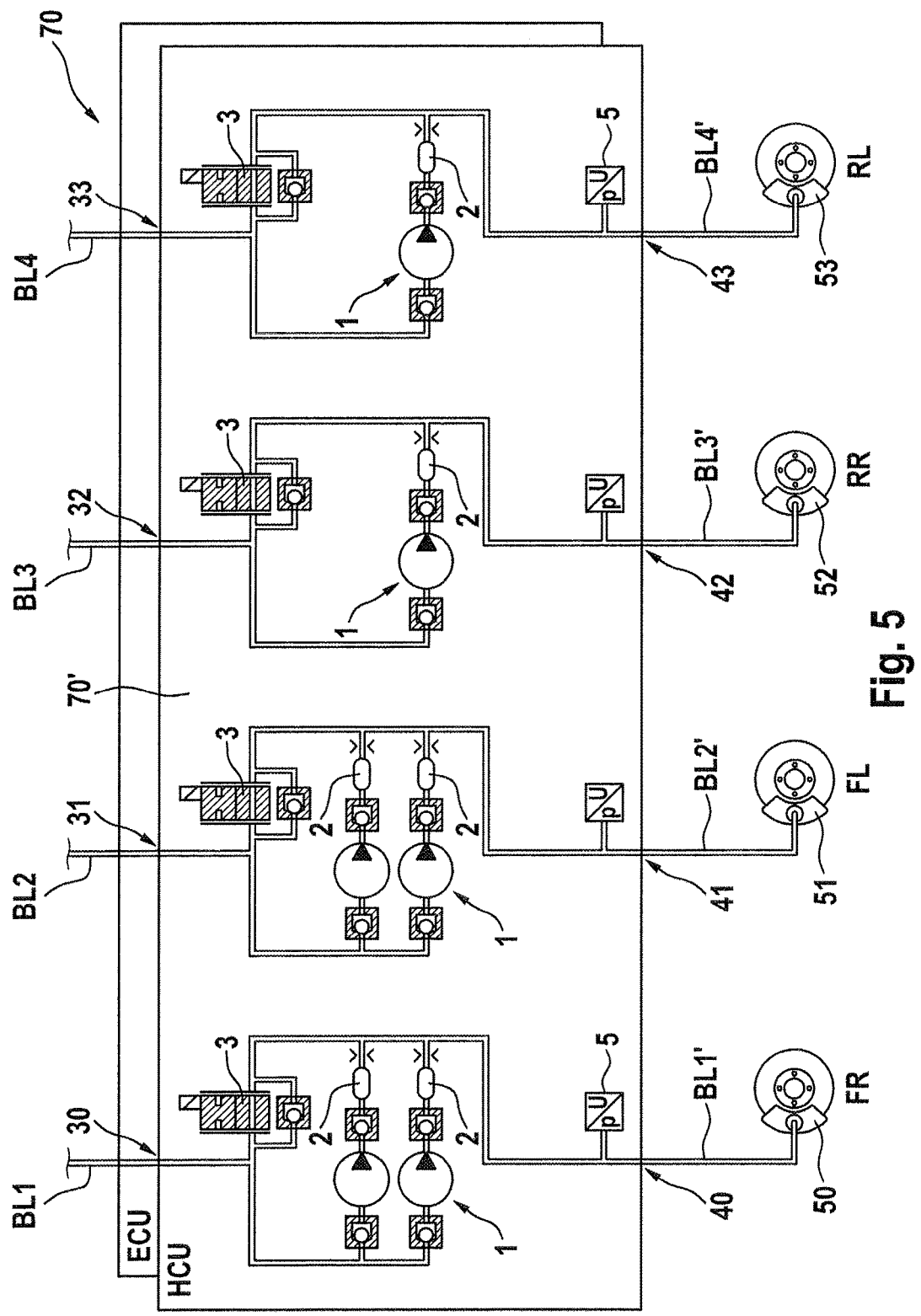
FIG. 5 shows a second exemplary embodiment of a brake control device according to an aspect of the invention.

A second exemplary embodiment of a brake control device 70 according to an aspect of the invention is schematically illustrated in FIG. 5. In contrast to the first exemplary embodiment from FIG. 4, two pumps, which are connected in parallel, or one dual-piston pump are provided for each of the front wheel brakes 50 and 51. As a result, the larger volumetric uptake of the front wheel brakes is taken into account and a greater pump capacity is made available. Comparable results can also be achieved using different piston sizes.

The pressure source of the second brake control unit 70 is preferably designed as a six-circuit pump.

Figure 6:
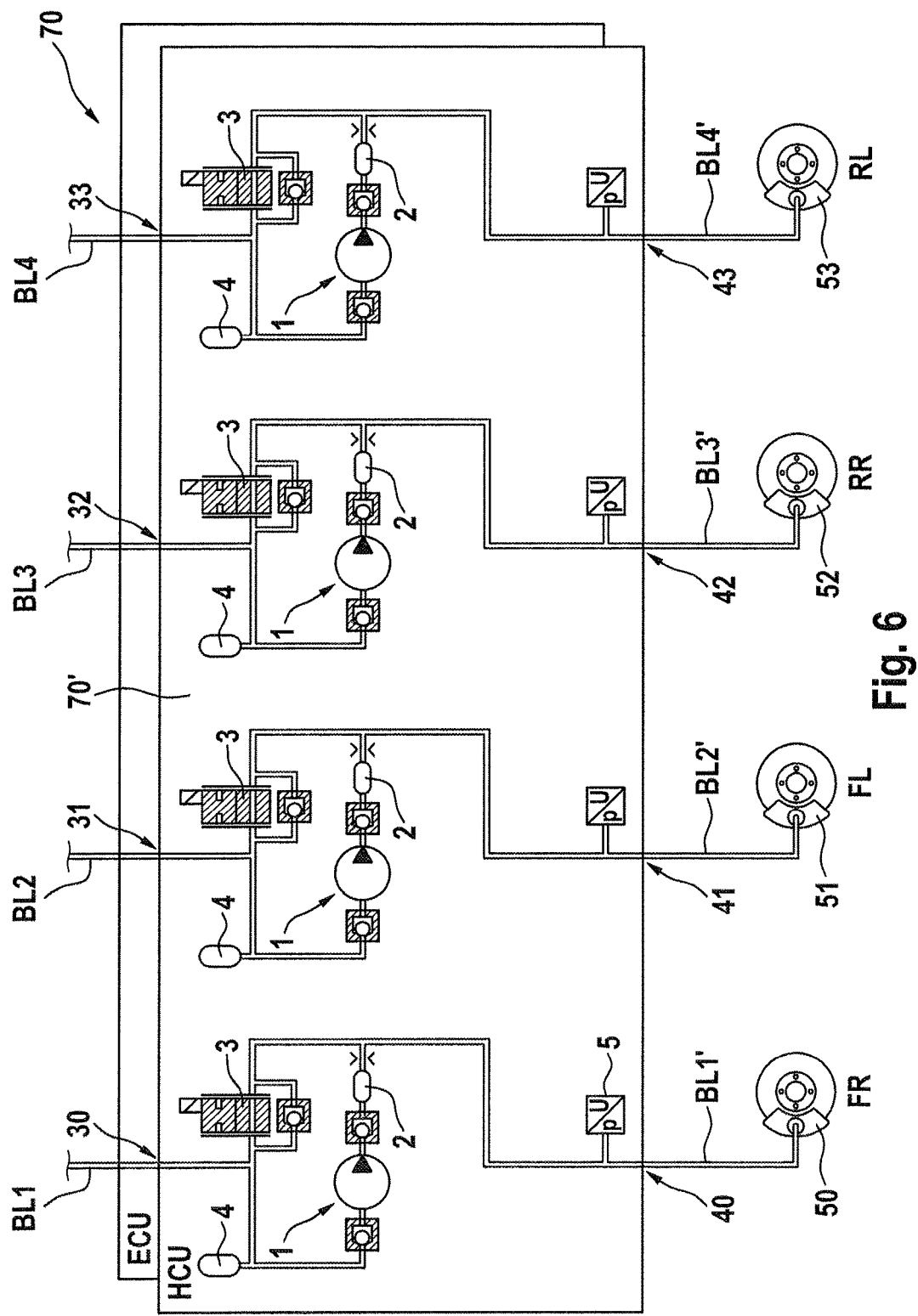
FIG. 6 shows a third exemplary embodiment of a brake control device according to an aspect of the invention.

A third exemplary embodiment of a brake control device 70 according to an aspect of the invention is schematically illustrated in FIG. 6. In contrast to the first exemplary embodiment from FIG. 4, a pressure medium reservoir 4, which is connected to the intake side of the pump, is provided for each pressure regulating circuit.

The pressure medium reservoir 4 is designed as a constant-pressure reservoir. Advantageously, the pressure medium reservoir 4 is high pressure-resistant and is filled in the idle state. The pressure medium reservoir 4 is used as a storage reservoir for the automatic priming of the assigned pump. The pressure medium reservoir 4 is designed, e.g., as a piston accumulator or as a bellows accumulator.

The pressure medium reservoirs 4 facilitate the intake of pressure medium or, advantageously, make a sufficient amount of pressure medium available for filling one brake caliper in each case, if pressure medium is not provided sufficiently quickly, or if no pressure medium is provided, via the upstream brake lines BL1, BL2, BL3, BL4.

According to a non-illustrated exemplary embodiment of a brake control device according to the invention, one pressure medium reservoir 4 according to FIG. 6 is provided for each front wheel brake 50, 51 for each pressure regulating circuit, in an exemplary embodiment according to FIG. 5 having two pumps, which are connected in parallel.

Figure 7:
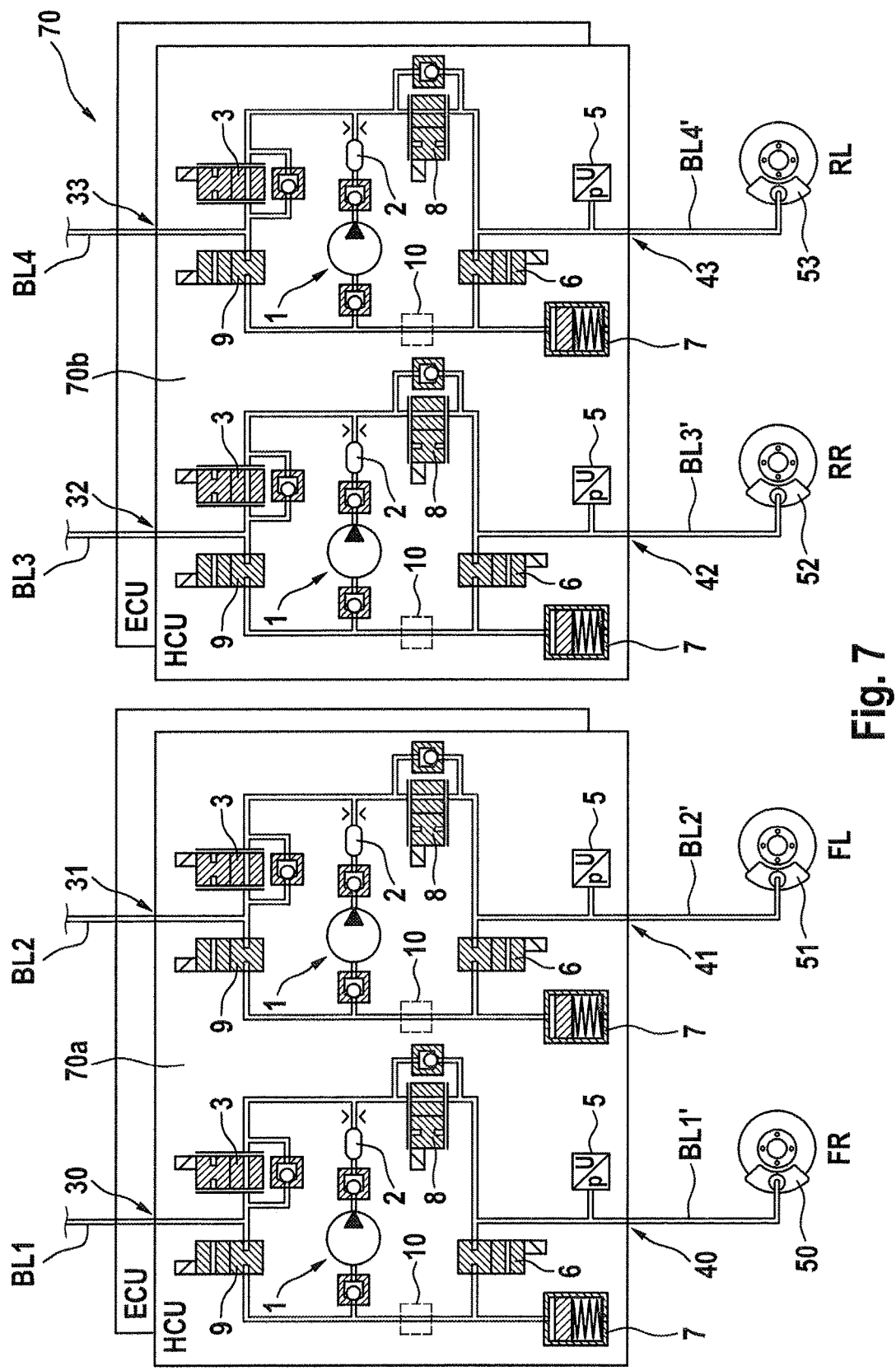
FIG. 7 shows a fourth exemplary embodiment of a brake control device according to an aspect of the invention.

A fourth exemplary embodiment of a brake control device 70 according to an aspect of the invention, which is designed in two parts, as two brake control units 70*a*, 70*b*, is schematically illustrated in FIG. 7. The brake lines BL1, BL2, which come from the outlet pressure connections 20, 21 of the (non-illustrated) first brake control unit 6Q, are connected at the inlet pressure connections 30, 31 of the brake control unit 70*a*. The brake lines BL1', BL2', which lead to the wheel brakes 50, 51, are connected at the outlet pressure connections 40, 41 of the brake control unit 70*a*. Correspondingly, the brake lines BL3, BL4, which come from the outlet pressure connections 22, 23 of the (non-illustrated) first brake control unit 60, are connected at the inlet pressure connections 32, 33 of the brake control unit 70*b*; the brake lines BL3', BL4', which lead to the wheel brakes 52, 53, are connected at the outlet pressure connections 42, 43 of the brake control unit 70*b*.

The brake control units 70*a*, 70*b* comprise, by way of example, four identical, completely separated pressure regulating circuits (one pressure regulating circuit for each wheel brake), each of which has a pressure source 1, an isolating valve 3, a switching valve 9, an inlet valve 8, an outlet valve 6, and a low-pressure accumulator 7. In addition, a pressure sensor 5 is provided for each wheel brake circuit.

The twelve valves 3, 6, 8, 9 form a pressure regulating valve arrangement for setting wheel-specific brake pressures at the outlet pressure connections 40, 41, 42, 43.

The isolating valves 3 are preferably designed and disposed in the first exemplary embodiment. By way of example, a non-return valve, which is open in the direction of the wheel brake 50, 51, 52, 53, is also connected here in parallel to each isolating valve 3.

An inlet valve 8, which is preferably designed so as to be open when not supplied with current and so as to be analogized or controllable in an analog manner, is disposed between the isolating valve 3 and the wheel brake. A non-return valve, which is open in the direction of the inlet pressure connection 30, 31, 32, 33, is preferably connected in parallel to the inlet valve 8.

In order to reduce brake pressure during an anti-lock control action, each wheel brake can be connected to the assigned low-pressure accumulator 7 via an outlet valve 6, which is closed when not supplied with current. Each low-pressure accumulator 7 can be connected to the assigned inlet pressure connection 30, 31, 32, 33 via a switching valve 9, which is closed when not supplied with current.

The design of the pressure source 1 corresponds to the first exemplary embodiment having a high pressure pump, a damping chamber 2, and two non-return valves. The intake side of each pump is connected to the connecting line between the outlet valve 6 and the switching valve 9, and the delivery side is connected to the connecting line between the isolating valve 3 and the inlet valve 8.

According to a non-illustrated exemplary embodiment of a brake control device according to the invention, the hydraulic arrangements of the brake control units 70*a* and 70*b* from FIG. 7 are disposed in a single brake control unit 70' (single-part brake control device 70). The brake control unit 70' then essentially corresponds to an ABS/ESP brake control unit known per se.

According to a further, non-illustrated exemplary embodiment of a brake control device according to the invention, the switching valves 9 in the pressure regulating valve arrangement of the fourth exemplary embodiment are omitted and, instead, a non-return valve, which is open in the direction of the inlet pressure connection 30, 31, 32, 33, is installed in the position marked with the dashed-line box 10 in FIG. 7, for each pressure regulating circuit.

According to a further, non-illustrated exemplary embodiment of a brake control device according to an aspect of the invention, the switching valves 9 of the pressure regulating valve arrangement and the low-pressure accumulator 7 are omitted in the fourth exemplary embodiment from FIG. 7.

Figure 8:
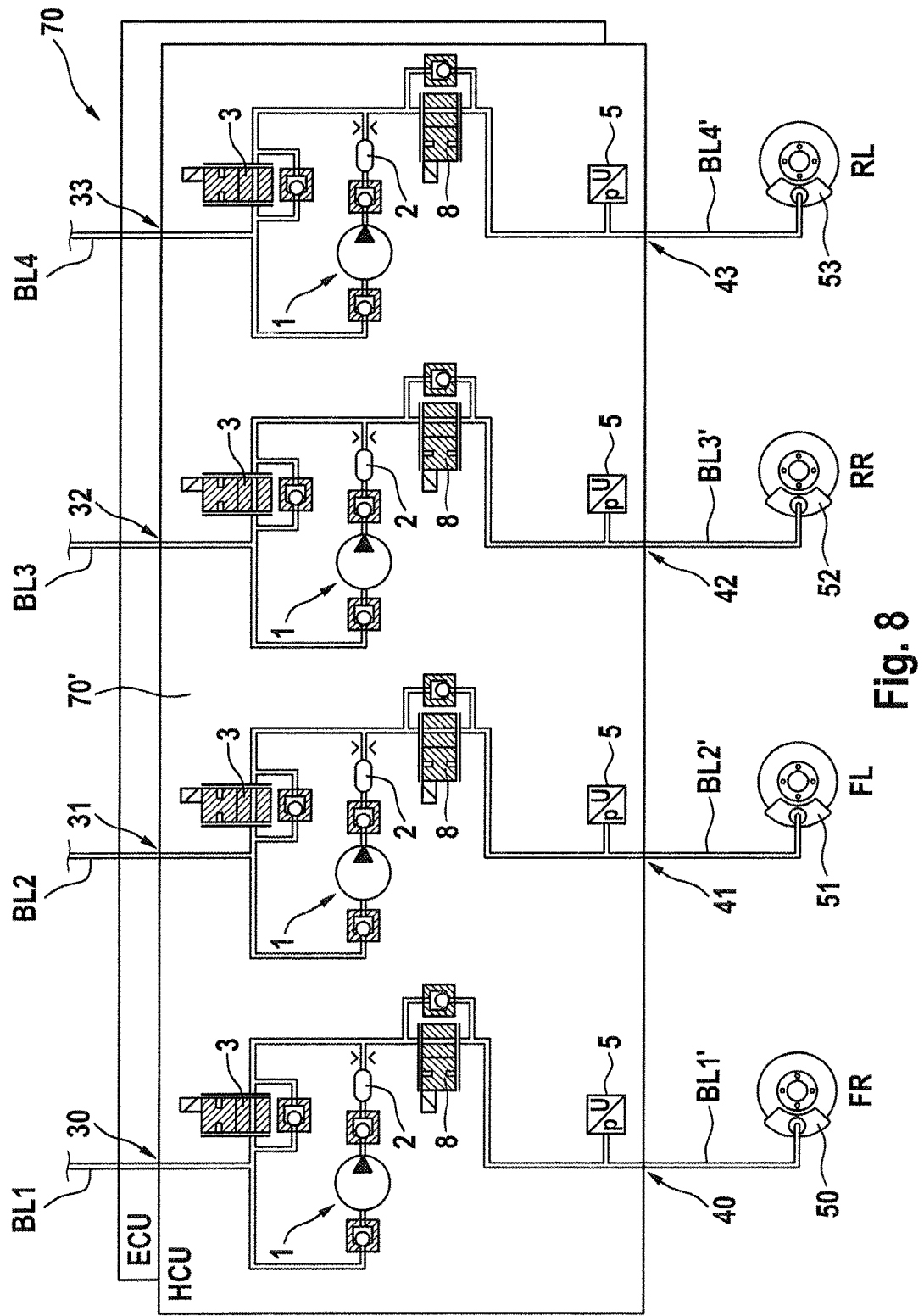
FIG. 8 shows a fifth exemplary embodiment of a brake control device according to an aspect of the invention.

A fifth exemplary embodiment of a brake control device 70 according to an aspect of the invention is schematically illustrated in FIG. 8. In contrast to the first exemplary embodiment from FIG. 4, in the pressure regulating valve arrangement, only one additional inlet valve 8 is provided for each pressure regulating circuit, which is designed so as to be open when not supplied with current and so as to be analogized or controllable in an analog manner. A non-return valve, which is open in the direction of the inlet pressure connection 30, 31, 32, 33, is preferably connected in parallel to the inlet valve 8.

If a brake control device 70 according to the invention is additionally installed between the first brake control device 60 and the wheel brakes 50, 51, 52, 53 in the brake systems shown in FIG. 3 by way of example, individual pressures can be set for each wheel brake or, if a pressure sensor 5 is present, said individual pressures can also be adjusted, by switching the pressure sources 1 on and controlling the isolating valves 3 in an analog manner.

In the case of a single-part brake control device 70, the pressure source 1 is preferably designed as an at least four-circuit pump. Particularly preferably, the pump is designed so as to have four circuits or six circuits.

In the case of a two-part brake control device 70, the pressure source 1 is preferably designed as a dual-circuit pump for each brake control unit 70*a*, 70*b*.

If the brake control device 70 does not have its own pressure medium reservoir 4, the upstream brake control device 60 is preferably designed such that an intake of pressure medium through the brake lines BL1, BL2, BL3, BL4 for the second brake control device 70 is possible. Therefore, pressure medium can be pumped to the wheel brakes even if the brake control device 60 has failed or is inactive.

Alternatively, e.g., when the flow resistance of the brake control device 60 is too high, it is preferred that the brake control device 70 comprises at least one pressure medium reservoir, e.g., in the form of a pressure-resistant bellows or piston accumulator.

The pump paths are illustrated in the exemplary embodiments from FIGS. 5 to 8 merely by way of example, e.g., a damping chamber 2 is optional.

Due to an aspect of the invention, the functional requirements on a brake system with regard to highly automated driving are met.

In addition, a design of a "module" for brake systems is possible, in which the standard vehicles without HAD can be equipped with only a first brake control device 60 and, optionally for the purpose of outfitting with the HAD function, the brake system can be easily expanded with a brake control device 70 according to the invention as the second brake control device, in particular as an auxiliary brake control unit.

The invention claimed is:

1. A brake control device for at least four fluidically actuatable wheel brakes of a vehicle brake system, the brake control device comprising:
 a wheel-specific inlet pressure connection for each wheel brake,
 a wheel-specific outlet pressure connection for each wheel brake,
 a pressure regulating valve arrangement for setting wheel-specific brake pressures at the outlet pressure connections, and
 a pressure source,
 wherein each wheel-specific inlet pressure connection is connected to only one of the wheel-specific outlet pressure connections.

2. The brake control device as claimed in claim 1, wherein the pressure source comprises at least one pump or at least one pump circuit of a pump for each wheel brake.

3. The brake control device as claimed in claim 2, wherein the pump is a multi-circuit pump.

4. The brake control device as claimed in claim 2, wherein the brake control device comprises a wheel sensor for each wheel brake, for detecting wheel brake pressure.

5. The brake control device as claimed in claim 1, wherein the brake control device comprises a wheel sensor for each wheel brake, for detecting wheel brake pressure.

6. The brake control device as claimed in claim 1, wherein the pressure regulating valve arrangement comprises at least one valve for each wheel brake, which valve is electrically actuatable.

7. The brake control device as claimed in claim 1, wherein the brake control device comprises a pressure medium reservoir for each wheel brake, which stores pressure medium for filling at least one wheel brake.

8. The brake control device as claimed in claim 1, wherein the brake control device is designed as a single part, as a brake control unit i) having an electronic control and regulating unit and ii) a hydraulic control and regulating unit.

9. The brake control device as claimed in claim 1, wherein the brake control device is designed in two parts or in multiple parts, each having i) an electronic control and regulating unit and ii) a hydraulic control and regulating unit.

10. The brake control device as claimed in claim 1, wherein the pressure regulating valve arrangement comprises at least one valve for each wheel brake, which valve is controllable in an analog manner or which is designed so as to be analogized.

11. The brake control device as claimed in claim 1, wherein the brake control device is designed as two brake control units, each having i) an electronic control and regulating unit and ii) a hydraulic control and regulating unit.

12. A brake system for vehicles, comprising:
 at least four hydraulically actuatable wheel brakes;
 at least a first electrohydraulic brake control device, which comprises a first pressure regulating valve arrangement for setting wheel-specific brake pressures, a first pressure source, and a wheel-specific outlet pressure connection for each wheel brake; and
 a second electrohydraulic brake control device, which comprises a second pressure regulating valve arrangement, a second pressure source, and a wheel-specific inlet pressure connection for each wheel brake, the second brake control device being connected in series between the first brake control device and the wheel brakes with each of the wheel-specific outlet pressure connections of the first brake control device being connected to only one of the wheel-specific inlet pressure connections of the second brake control device.

13. The brake system as claimed in claim 12, wherein the second brake control device comprises a wheel-specific outlet pressure connection for each wheel brake, which connection is connected to one of the wheel brakes.

14. The brake system as claimed in claim 12, wherein the first brake control device is designed as a single part, as a brake control unit having i) an electronic control and regulating unit and ii) a hydraulic control and regulating unit, or is designed in two parts, as two brake control units each of which has i) an electronic control and regulating unit and ii) a hydraulic control and regulating unit.

15. The brake system as claimed in claim 12, wherein for each of the wheels provided with a wheel brake:
 at least two devices for detecting a wheel speed are provided, wherein a signal from one of the devices is fed to the first brake control device and a signal from the other device is fed to the second brake control device, or
 at least one redundantly designed device for detecting a wheel speed is provided, wherein a signal from the device is fed to the first brake control device and a signal is fed to the second brake control device.

16. The brake system as claimed in claim 12, wherein the first brake control device is supplied with electrical energy from a first electrical energy source and the second brake control device is supplied with electrical energy from a second electrical energy source.

17. The brake system as claimed in claim 12, wherein the first brake control device is connected via a first data connection and the second brake control device is connected via a second data connection to a third electronic control and regulating unit which specifies a braking demand or a brake pressure setpoint value.

18. The brake system as claimed in claim 12, wherein the second brake control device comprises:
 a wheel-specific outlet pressure connection for each wheel brake.

19. The brake system as claimed in claim 12, wherein the first data connection is a first data bus and the second data connection is a second data bus.

20. A brake system for vehicles, comprising:
 at least four hydraulically actuatable wheel brakes;
 at least one first electrohydraulic brake control device, which comprises a first pressure regulating valve arrangement for setting wheel-specific brake pressures, a first pressure source and a wheel-specific outlet pressure connection for each wheel brake, the at least one first electrohydraulic brake control device supplied with electrical energy from a first electrical energy source; and
 a second electrohydraulic brake control device, which comprises a second pressure regulating valve arrangement and a second pressure source, the second electrohydraulic brake control device connected in series between the first brake control device and the wheel brakes, the second electrohydraulic brake control device supplied with electrical energy from a second electrical energy source separate from the first electrical energy source.

\* \* \* \* \*